Figure 1:
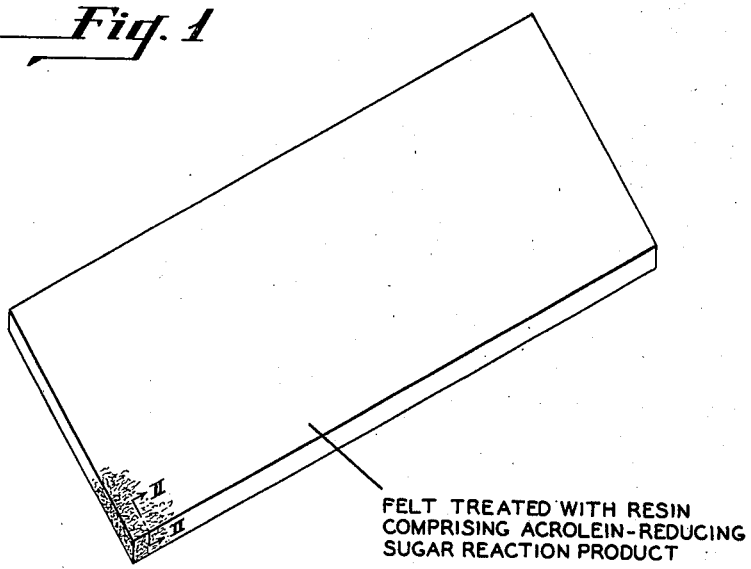

Feb. 4, 1958  P. E. MERRIFIELD  2,822,298
FIBROUS PRODUCTS
Filed Aug. 29, 1951

FELT TREATED WITH RESIN COMPRISING ACROLEIN-REDUCING SUGAR REACTION PRODUCT

FIBERS

COATING COMPRISING ACROLEIN-REDUCING SUGAR RESIN

INVENTOR
PAUL E. MERRIFIELD
by
Theodore L. Thomas
ATTORNEY

United States Patent Office 2,822,298
Patented Feb. 4, 1958

2,822,298

FIBROUS PRODUCTS

Paul E. Merrifield, Manor Township, Lancaster County, Pa., assignor to Armstrong Cork Company, Lancaster, Pa., a corporation of Pennsylvania Application August 29, 1955, Serial No. 531,263

22 Claims. (Cl. 117—140)

This invention relates generally to fibrous products, and more particularly to fibrous products treated with resinous products. Still more particularly, the invention relates to a felted product treated with the resinous reaction product of acrolein and a reducing sugar. The invention also relates to methods of producing so-treated felt.

It has long been known to treat felted sheets with oil-resistant resins in order to form a strong and sturdy felt which finds particular use in the filtration of oils and similar products. Phenol-formaldehyde resins are generally used in the preparation of such felts. However, due to the stickiness of the phenol-formaldehyde resin during drying, it has been found imposible to prepare such resin-treated felts on the usual papermaking machines. This has been true because the treated felt sticks to the drying drums in the paper machine and thus renders normal production impossible. Thus, there has been the need for some technic that would allow the production of felts suitable for the filtration of oil and similar material on a standard papermaking machine.

It is the primary object of the present invention to supply such a process. It is a further object of the present invention to supply a strong felt resistant to the action of solvents and yet which is porous and permeable.

These objects have been accomplished in an unusually effective manner. The invention contemplates a product comprising fibers in the form of a felt. Deposited on the fibers is the resinous reaction product of acrolein and a reducing sugar.

Figure 2:
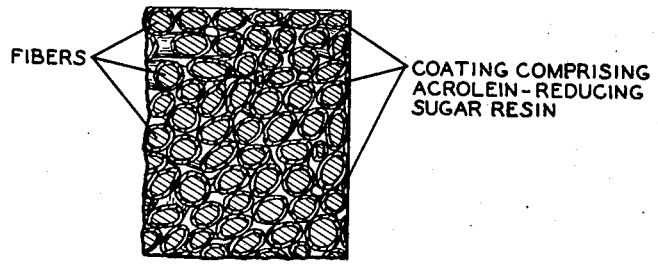

In the drawings:

Figure 1 shows a felt which has been treated with an acrolein-reducing sugar reactive product; and Figure 2 shows an enlarged cross section of Figure 1 taken along the lines II—II, showing cross sections of fibers in various orientations coated and bonded with a composition comprising acrolein-reducing sugar resin.

The resin used in the present invention is that reaction product formed when acrolein and a reducing sugar are refluxed under acidic conditions in the presence of water until the acrolein has substantially all reacted. As examples of the reducing sugars which may be used, there may be mentioned fructose (levulose), mannose, lactose, galactose, and dextrose (glucose); dextrose is the sugar of choice. Additionally, there may be used mixtures of reducing sugars such as are found in invert sugar.

The amount of acrolein to be used should be approximately one equivalent of acrolein to one equivalent of the sugar. Among the reducing sugars, the equivalent basis will vary according to the number of hydroxyl groups in the sugar molecule. Generally speaking, the functionality of the hexose sugar molecules will be one less than the number of the hydroxyl groups in that molecule. Thus, for a reducing sugar such as dextrose and fructose containing 5 hydroxyl groups, the functionality will be 4. Since the functionality of the acrolein in this reaction appears to be 3, it can be seen that 4/3 moles of the acrolein are needed for every mole of a hexose such as dextrose. Although the relative amounts may be varied somewhat from the precise equivalent amounts, the variation should not be too great to produce the resin useful in the present invention.

The reaction of the present invention may be carried out by admixing the requisite quantities of acrolein and a reducing sugar in an aqueous medium and heating to an elevated temperature under acidic conditions. The aqueous medium is apparently essential in order that the acrolein may react with the reducing sugar. Much better yields are obtained if the acrolein contains small amounts of a polymerization inhibitor such as hydroquinone. It is preferred that the pH of the reaction medium be in the range of about 1 to about 3, with the optimum pH being about 1.8, where fairly strong acid conditions are used. Acids used to achieve this pH range may be oxalic, citric, or even small amounts of the inorganic acids such as sulfuric acid. It is generally desirable to make the medium as acidic as possible to promote the reaction, yet not so acidic as to destroy the acrolein or the sugar.

The actual reaction is carried out in simple fashion. Acrolein, the reducing sugar, the water, the catalyst, and additional solvent, if any is needed, are simply admixed and heated to reflux. The reflux temperature will generally be determined by the boiling point of the acrolein. In the reaction of acrolein with dextrose, the reflux temperature will be in the range of about 50°–60° C. These conditions should be maintained until the acrolein has substantially all condensed with the sugar. Where acrolein is reacted with dextrose, this takes about 4 hours. Thereafter, the temperature of the reaction mixture may be raised an additional 15–35° C. and those conditions maintained for an additional period of time necessary to form the polymer. In the case of acrolein and dextrose, this will generally be about 12–24 hours. Elevated pressures may be used to shorten the reaction time and an inert atmosphere may be used to minimize the discloring effects of oxygen.

On completion of the reaction, the excess water and additional solvent, if any, may be distilled off; vacuum may be used if desired. When most of the water has been removed, the hot resin may be poured out in pans to harden. Subsequently, it may be ground or melted to be dissolved in water for use in the present invention.

The resin obtained by the above-described process is a thermosetting resin which cures without a catalyst with the evolution of water. The resin is of a light amber or golden yellow color; the color may be lightened by carrying out the polymerization reaction under an inert atmosphere such as nitrogen, as mentioned earlier. Resin color is also affected by the relative amount of acrolein used and by the pH of the reaction medium. The higher the relative amount of acrolein and the lower the pH, the darker the color. Before curing, the resin is hard and flexible and hygroscopic. It may be plasticized with known plasticizers, for example, glycerine, diethylene glycol, and similar glycols. It may also be temporarily plasticized by water by a simple soaking process after curing. When cured at a temperature of 300°–325° F. for a period of about one-half hour, the resin forms an oil-resistant, alkali-resistant, heat resistant, water-insoluble film; acid resistance is only fair. One of the outstanding advantages of the resin is that it does not pass through a tacky stage during the curing cycle. It is this peculiar property of the resin that is taken advantage of in the present invention. Another outstanding advantage of the above-described resin is that it is completely compatible with phenolic resin and will cure when admixed with curable phenol-aldehyde resin.

The felt to be treated by the above-described resin may be composed of any of those fibers normally used in felt manufacture. The fibers may be of cellulose, as is found in cotton and wood fibers, or they may be of wool, asbestos, or any of the synthetic fibers, including rayon and rayon acetate. Mixtures of the above fibers may also be utilized. Where the felt is to be used as a filter felt, it is preferred that rayon fibers be used.

The formation of the felted sheet from any of the above-described fibers proceeds along lines well-known in the art. The aqueous slurry containing the fibers may be used to lay down the felt either on a wire or a cylinder in accordance with known principles. If the product is to be utilized as a filter felt, then a certain amount of one of the usual binders should be deposited on the fibers before the felt is formed in order to lend requisite strength to the web during the earlier stages of processing. Generally speaking, where rayon fibers are used, it is preferred that less than about 7½% by weight of the fibers of one of the usual butadiene-acrylonitrile copolymers be deposited on the fibers before forming the felt. Smaller amounts of the butadiene-acrylonitrile copolymer (Buna N) may be used if other means are taken to strengthen the web. For example, locust bean gum in an amount of about 5% on the weight of the fibers may be used. Where locust bean gum is used during the felt-forming processes, a stronger sheet is obtained and the drainage is slowed down to a more preferable rate than would be obtained with the rayon fibers in the absence of locust bean gum.

As a general rule, the amount of binder to be put on the felt initially in the form of butadiene-acrylonitrile copolymer is not critical except as the larger amounts of binder affect the porosity of the final felt. Amounts of Buna N of about 15% and up begin to cause the diminution of the porosity of the felt to the extent that the felt is not as useful as a filter felt. It is for this reason, then, that the binder on the felt should be kept as low as possible consistent with sufficient strength of the web to prevent breakage or other deleterious effects.

After forming, the felt is drained and handled as usual on the paper-forming machine. Once the web has been drained and preferably given a light squeeze, the acrolein-reducing sugar resin may be applied thereto. Since the resin is water-soluble, it is convenient to apply the resin from a water solution. The water solution of the resin may be put on the felt in any convenient manner. This may be done by means of a roll applicator, by dipping the felt into the resin solution followed by light squeezing if desired, or by spraying the resin solution directly onto the felt. If it is not convenient to apply the resin solution to the moist felt, the felt may be dried in the usual manner, stored, and then treated with the resin solution at another time or place.

The amount of resin to be deposited on the felt by a method such as is described above may vary between about 10% and about 50%, based on the dry weight of the felt and binder. Amounts lower than about 10% may be used, but the final product then does not possess sufficient rigidity for most purposes. Amounts larger than about 50% yield a felt that may be too stiff for most purposes; the porosity of the felt may also be adversely affected by such large amounts of resin. Preferably the final product possesses about 40%±5% by weight resin based on the dry weight of the felt.

Since the moist felt picks up about 200% by weight of an aqueous solution, it is readily apparent that the concentration of resin in the water should be about 20% in order that the final amount deposited on the felt will be in the desired range of about 40% by weight. However, the concentration of the aqueous resin solution is not critical and may be varied in accordance with the amount of resin desired to be deposited on the felt. Two or more applications of aqueous resin solution may be utilized if desired.

Once the aqueous resin solution has been taken up by the felt, the felt may be subjected to a light squeeze if desired. Thereafter, the felt is dried on the drum driers that are an integral part of most paper machines. It is in the drying portion of the total felt-making operation that the outstanding and unexpected release properties of the earlier-described resin come into play. The felt may readily be dried on the drums without any signs of sticking thereto. It is the drying step that renders impossible the preparation of a felt from straight phenol-aldehyde resins on the usual papermaking machine. This is true because the felt containing the phenolic resin deposited thereon sticks so badly to the surface of the drums that operation is impossible. However, the acrolein-reducing sugar resin causes no such problems.

Generally speaking, the surface temperature of the drums or rolls is in the range of about 250°–290° F. This surface temperature with operation at normal speeds raises the felt to a temperature of about 210° F. The water is driven off and the uncured resin is left on the felt; the felt remains flexible.

Thereafter, the felt may be formed into any desired shape and treated at elevated temperature in order to cure the resin. The treated felt may be passed through corrugating rolls and pleating machines to form pleats in accordance with usual filter felt procedures. After pleating, cure may be accomplished at a temperature of about 300° F. for a period of time of about 30 minutes. If desired, however, cure can be accomplished at a lower temperature, as for example about 280° F., and even lower for longer periods of time. The upper limit of cured temperature is about 350° F. Temperatures higher than this are likely to scorch the felt. It is understood that lower temperatures require longer periods of time in order to accomplish the cure of the resin deposited on the felt.

An unexpected advantage of the product of the present invention is that the earlier-described acrolein-reducing sugar resin may be combined with a water-soluble, phenol-formaldehyde, thermosetting resin in order to prevent this latter resin from causing the felt to stick to the heating rolls as the felt passes through the drier. Examples of the water-soluble, thermosetting, phenol-formaldehyde resins useful in the present invention are those designated as: "Durez 14798," "Durez 16056," made by Durez Plastics and Chemicals, Inc.; "Br-15100" and "Br-18583," made by Bakelite Company.

The acrolein-reducing sugar resin has a longer cure time than the phenol-formaldehyde resins normally used in the preparation of such felts. As mentioned earlier, however, felts containing phenol-formaldehyde resins cannot be made on usual papermaking machinery because of sticking. A combination of the two resins takes advantage of the shorter cure time of the phenol-formaldehyde resin and the excellent release properties of the acrolein-reducing sugar resin. Thus, one embodiment of the present invention involves a placing of a mixture of the resins on the felt. Other phenolic resins such as resorcin-phenol resins may be used with the acrolein resin if desired.

It is preferred that a one-to-one mixture of acrolein-reducing sugar and phenol-formaldehyde resin be used. However, lesser amounts of the acrolein-reducing sugar resin may be used, if desired. It has been shown that the release properties of the acrolein resin are such that a 1:3 ratio on a weight basis of acrolein-reducing sugar:phenol-formaldehyde resin possesses sufficiently good release properties to be used on the standard papermaking machines. The procedure for applying the mixture of resins is the same as that for applying the acrolein-reducing sugar resin alone. Preferably, a water solution containing 20% by weight resins is used to deposit the resins on the felt. The amount of acrolein-reducing sugar resin in the resin mixture may vary, as described above, from about 25% to 100% of the total weight of the resins.

Although the product of the present invention may be used anywhere where there is required a porous felt having good oil resistance, good alkali and water resistance, and good strength, the present product lends itself particularly to use as oil filters. The final product has good longitudinal strength and sufficient strength to prevent the pleats from being closed and thus decreasing the filtering surface. For this use, rayon fibers possess the best filtering characteristics, since they can be cut without fibrillating.

The following examples illustrate several embodiments of the invention. All parts are by weight unless otherwise stated.

*Example I*

Several sheets measuring 5" x 6" were made from rayon and cotton fibers; the sheets contained less than 20% cotton. Five percent by weight butadiene-acrylonitrile copolymer ("Hycar") based on the dry weight of the fibers was deposited on the fibers by beater saturation. The sheets were made in a hand mold and dried.

An acrolein-dextrose resin was taken up in water to form an aqueous solution containing 20% solids. A felted sheet was dipped into the resin solution and then passed through light wringer rolls.

Subsequently, the treated felt was placed on a brass, curved hot plate equipped with a curved screen cover. The surface of the hot plate was heated to 300° F. The sheet was left on until dry, which took about 10 minutes.

After drying, the sheet was readily removed from the surface of the hot plate simply by lifting the edges with a spatula and peeling the sheet off. No sticking occurred.

*Example II*

Example I was repeated save that instead of an acrolein-dextrose resin there was used a water-soluble, thermosetting, phenol-formaldehyde resin sold by the Bakelite Company under the designation "Br–18583." A 20% aqueous resin solution was used.

When a sheet treated with the phenol-formaldehyde resin was dried on the hot plate, as in Example I, the sheet could not be removed. In fact, nitric acid was needed to get the remnants of the sheet off the plate.

*Example III*

A solution of about 250 cc. was prepared containing a total resin content of about 20%. The resin content consisted of the acrolein-dextrose resin of Example I and the phenol-formaldehyde resin of Example II, each resin being present in equal parts by weight.

A sheet, treated as in Example I and dried on the curved hot plate, was as easily removed from the hot plate as was the sheet in Example I.

The sheet was cured at 300° F. for 10 minutes after pleating, whereupon there was formed a strong, inert, porous filter felt having excellent properties as an oil filter.

*Example IV*

Example III was repeated save that the total resin content consisted of 25% acrolein-dextrose resin; the acrolein resin and the phenolic resin were present in a weight ratio of 1:3. The usual 20% solution in water was prepared.

A sheet dried on the curved hot plate could be readily removed therefrom, but a greater tendency to stick to the surface of the plate was noted, as opposed to the sticking exhibited by the previously described sheets containing the acrolein-dextrose resin.

*Example V*

One hundred and fifty pounds of acrolein-dextrose resin and 150 pounds of a water-soluble thermosetting phenol-formaldehyde resin ("Durez 16056") was dissolved in 1,200 pounds of water to give a solution containing 20% resin solids.

On a full size paper machine, a web consisting of rayon fibers with 5% "Hycar" rubber as a binder was formed and dried in the usual manner and subsequently passed through the resin solution. After saturation, the web was treated to a light squeeze.

On passing over the drier section of the paper machine wherein the rolls were maintained at a temperature of about 290° F., no sticking at all was noted and the run proceeded without incident.

Portions of the treated web were passed through corrugating rolls, pleated, and subsequently cured at 300° F. for 10 minutes, thus forming an excellent full flow filter felt.

I claim:

1. A product comprising felt having deposited thereon the resinous reaction product of acrolein and a reducing sugar prepared under acidic conditions in the presence of water.

2. A product comprising felt having deposited thereon the resinous reaction product of acrolein and dextrose prepared under acidic conditions in the presence of water.

3. A product comprising felt having deposited thereon the resinous product of acrolein and a reducing sugar in an amount of about 10%–50% by weight resin based on the dry weight of the sheet, said product being prepared under acidic conditions in the presence of water.

4. A product according to claim 3 containing about 35%–45% by weight of said resin based on the dry weight of the sheet.

5. A product according to claim 3 wherein said resin comprises the reaction product of acrolein and dextrose.

6. A felt sheet comprising fibers having deposited thereon less than about 7½% butadiene-acrylonitrile copolymer as a binder and a resin comprising the reaction product of acrolein and a reducing sugar prepared under acidic conditions in the presence of water.

7. A product according to claim 6 wherein said reducing sugar comprises dextrose.

8. A product comprising felt having deposited thereon a resinous mixture comprising a water-soluble, thermosetting, phenol-formaldehyde resin and a resinous product of acrolein and a reducing sugar prepared under acidic conditions in the presence of water.

9. A product according to claim 8 wherein said reducing sugar comprises dextrose.

10. A product according to claim 8 wherein said resinous mixture comprises about 50% by weight of said phenolic resin and about 50% by weight of said acrolein resin.

11. A product according to claim 9 wherein said resinous mixture comprises about 75% by weight of said phenolic resin and about 25% by weight of said acrolein resin.

12. A product comprising felt having less than about 7½% butadiene-acrylonitrile copolymer as a binder therefor, said fibers having deposited thereon a resinous mixture comprising a water-soluble thermosetting phenol-formaldehyde resin and the reaction product of acrolein and a reducing sugar, said reaction product being prepared under acidic conditions in the presence of water.

13. A product according to claim 12 wherein said reducing sugar comprises dextrose.

14. The method of forming a full flow filter felt which comprises forming a sheet of felted fibers having deposited thereon less than about 7½% butadiene-acrylonitrile copolymer as a binder, depositing on said sheet the resinous product of acrolein and a reducing sugar prepared under acidic conditions in the presence of water, and drying said sheet.

15. The method according to claim 14 wherein said reducing sugar comprises dextrose.

16. The method according to claim 14 wherein said resin is deposited to the extent of about 10%–50% by weight of said resinous product based on the dry weight of the sheet.

17. The method according to claim 16 wherein said resinous product is deposited to the extent of about 40% by weight based on the dry weight of the sheet.

18. The method of forming a full flow filter felt which comprises forming a sheet of felted fibers having deposited thereon less than about 7½% butadiene-acrylonitrile copolymer as a binder, depositing on said sheet a resinous mixture comprising water-soluble, thermosetting, phenol-formaldehyde resin, and the resinous reaction product of acrolein and a reducing sugar prepared under acidic conditions in the presence of water.

19. The method according to claim 18 wherein said resinous mixture comprises about 50% by weight of said phenolic resin and about 50% by weight of said acrolein-reducing sugar resin.

20. The method according to claim 19 wherein said resinous mixture is present in an amount of about 10%–50% by weight based on the dry weight of the sheet.

21. The method according to claim 20 wherein said reducing sugar comprises dextrose.

22. The method according to claim 21 followed by the step of curing said resin at a temperature in the range of about 280°–350° F.

References Cited in the file of this patent
UNITED STATES PATENTS

| | | |
|---|---|---|
| 2,121,810 | McManus | June 28, 1938 |
| 2,401,776 | Rothrock | June 11, 1946 |
| 2,563,897 | Wilson | Aug. 14, 1951 |
| 2,574,849 | Talalay | Nov. 13, 1951 |
| 2,597,087 | Cowgill | May 20, 1952 |
| 2,705,691 | Panagrossi | Apr. 5, 1955 |
| 2,719,803 | Nottebohm | Oct. 4, 1955 |
| 2,734,841 | Merriman | Feb. 14, 1956 |
| 2,772,995 | Wilson | Dec. 4, 1956 |
| 2,773,781 | Rodman | Dec. 11, 1956 |

U. S. DEPARTMENT OF COMMERCE
PATENT OFFICE

CERTIFICATE OF CORRECTION

Patent No. 2,822,298                                February 4, 1958

Paul E. Merrifield

It is hereby certified that error appears in the printed specification of the above numbered patent requiring correction and that the said Letters Patent should read as corrected below.

Column 2, line 38, for "discloring" read -- discoloring --; line 62, for "heat resistant" read -- heat-resistant --; column 6, line 31, after "sheet" insert -- product --.

Signed and sealed this 1st day of April 1958.

(SEAL)

Attest:
KARL H. AXLINE
Attesting Officer

ROBERT C. WATSON
Commissioner of Patents